US008370941B1

(12) United States Patent
Pham et al.

(10) Patent No.: US 8,370,941 B1
(45) Date of Patent: Feb. 5, 2013

(54) ROOTKIT SCANNING SYSTEM, METHOD, AND COMPUTER PROGRAM PRODUCT

(75) Inventors: Khai N. Pham, Beaverton, OR (US); Aditya Kapoor, Hillsboro, OR (US); Harinath V. Ramachetty, Bangalore (IN); Rachit Mathur, Hillsboro, OR (US)

(73) Assignee: McAfee, Inc., Santa Clara, CA (US)

( * ) Notice: Subject to any disclaimer, the term of this patent is extended or adjusted under 35 U.S.C. 154(b) by 862 days.

(21) Appl. No.: 12/116,063

(22) Filed: May 6, 2008

(51) Int. Cl.
*G06F 11/00* (2006.01)
(52) U.S. Cl. ............ 726/24; 709/201; 709/224; 726/5; 726/22; 726/23; 726/25; 726/26
(58) Field of Classification Search ............ 726/22–26, 726/5; 714/38; 709/201, 224
See application file for complete search history.

(56) References Cited

U.S. PATENT DOCUMENTS

| 5,987,610 | A | 11/1999 | Franczek et al. | |
|---|---|---|---|---|
| 6,073,142 | A | 6/2000 | Geiger et al. | |
| 6,460,050 | B1 | 10/2002 | Pace et al. | |
| 7,506,155 | B1 | 3/2009 | Stewart et al. | |
| 2007/0078915 | A1 | 4/2007 | Gassoway | 707/205 |
| 2007/0079178 | A1* | 4/2007 | Gassoway | 714/38 |
| 2007/0209075 | A1 | 9/2007 | Coffman | 726/23 |
| 2007/0226704 | A1 | 9/2007 | Nichols | 717/131 |
| 2007/0226800 | A1 | 9/2007 | Nichols | 726/24 |
| 2007/0255724 | A1 | 11/2007 | Jung et al. | 707/10 |
| 2007/0294756 | A1 | 12/2007 | Fetik | 726/11 |
| 2008/0005797 | A1* | 1/2008 | Field et al. | 726/24 |
| 2008/0016572 | A1 | 1/2008 | Burkhardt et al. | 726/24 |
| 2008/0028462 | A1* | 1/2008 | Burtscher | 726/22 |

OTHER PUBLICATIONS

Rootkits and related attacks prevention and detection Nguyen, Lynette Qu. ProQuest Dissertations and Theses 2010. vol. 0984,Iss. 0029;p. n/a.*
Fast user-mode rootkit scanner for the enterprise Yi-Min Wang, Doug Beck. LISA '05: Proceedings of the 19th conference on Large Installation System Administration Conference—vol. 19 , vol. 19 Dec. 2005.*
Uncover hidden PC activity. Thompson, Jon; Thompson, Jon. APC (0725-4415) May 1, 2012. vol. 32,Iss.5;p. 97-99;Source: Internet and Personal Computing Abstracts.*
Mukhi et al., "Helios Technology Whitepaper," MIEL e-Security Pvt. Ltd., http://helios.miel-labs.com/downloades/whitepaper.pdf, Aug. 2006.
Rutkowska, "Thoughts about Cross-View based Rootkit Detection," Jun. 2005, http://www.invisiblethings.org/papers/crossview_detection_thoughts.pdf.
Butler et al., "Windows rootkits of 2005, part three," Jan. 5, 2006, http://www.securityfocus.com/infocus/1854.

* cited by examiner

*Primary Examiner* — Taghi Arani
*Assistant Examiner* — Angela Holmes
(74) *Attorney, Agent, or Firm* — Patent Capital Group

(57) ABSTRACT

A rootkit scanning system, method, and computer program product are provided. In use, at least one hook is traversed. Further, code is identified based on the traversal of the at least one hook. In addition, the code is scanned for at least one rootkit.

13 Claims, 7 Drawing Sheets

US 8,370,941 B1

ROOTKIT SCANNING SYSTEM, METHOD, AND COMPUTER PROGRAM PRODUCT

FIELD OF THE INVENTION

The present invention relates to computer and network security systems, and more particularly to security systems for detecting and cleaning rootkits.

BACKGROUND

Traditionally, security systems have oftentimes utilized heuristic (e.g. cross view based, integrity checkers, etc.) detection techniques for detecting rootkits. However, such heuristic detection techniques have been associated with various limitations. For example, conventional techniques have detected rootkits by detecting suspicious behavior, thus inhibiting any ability to classify the rootkits in a manner so as to provide precise detection and cleaning capabilities, along with an inability to provide details of a particular family of rootkits.

In addition, some traditional security systems have utilized signature based techniques for detecting rootkits. However, such signature based techniques have also generally exhibited various limitations. For example, traditional signature based techniques have customarily been unable to identify specific areas of memory for scanning for rootkits, thus resulting in a costly and inefficient manner of performing rootkit detection in addition to an inability to provide precise cleaning capabilities.

There is thus a need for overcoming these and/or other issues associated with the prior art.

SUMMARY

A rootkit scanning and optional removal system, method, and computer program product are provided. In use, at least one hook is traversed. Further, code is identified based on the traversal of the at least one hook. In addition, the code is scanned for at least one rootkit and appropriate cleaning action may optionally be taken.

DETAILED DESCRIPTION

Figure 1:
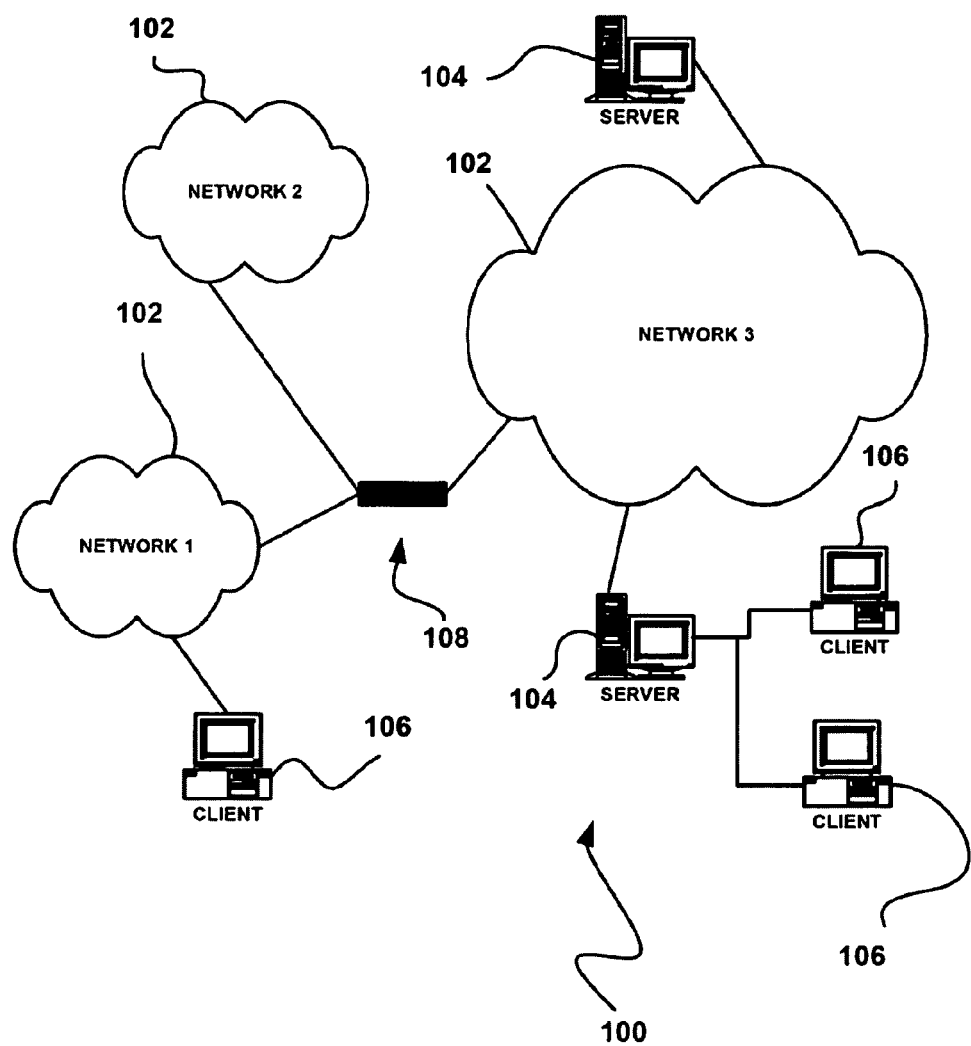
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
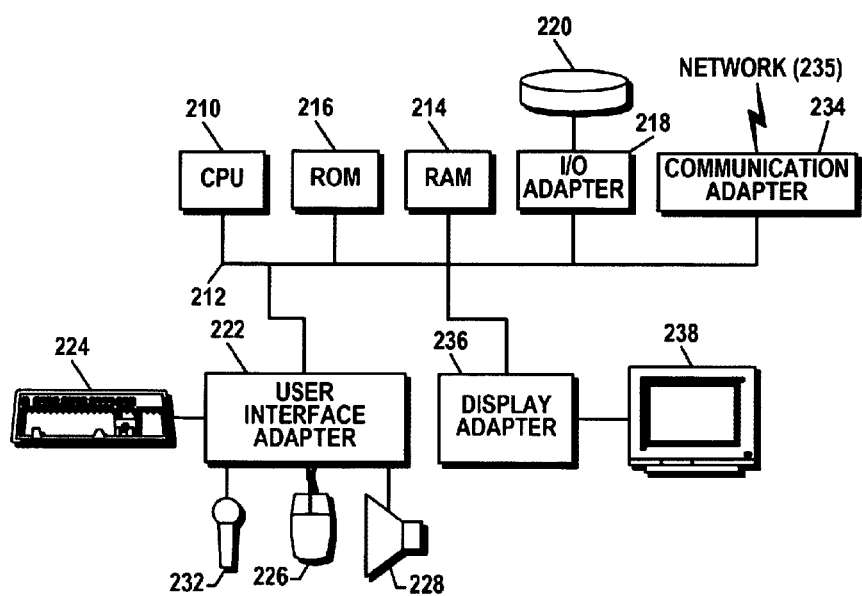
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
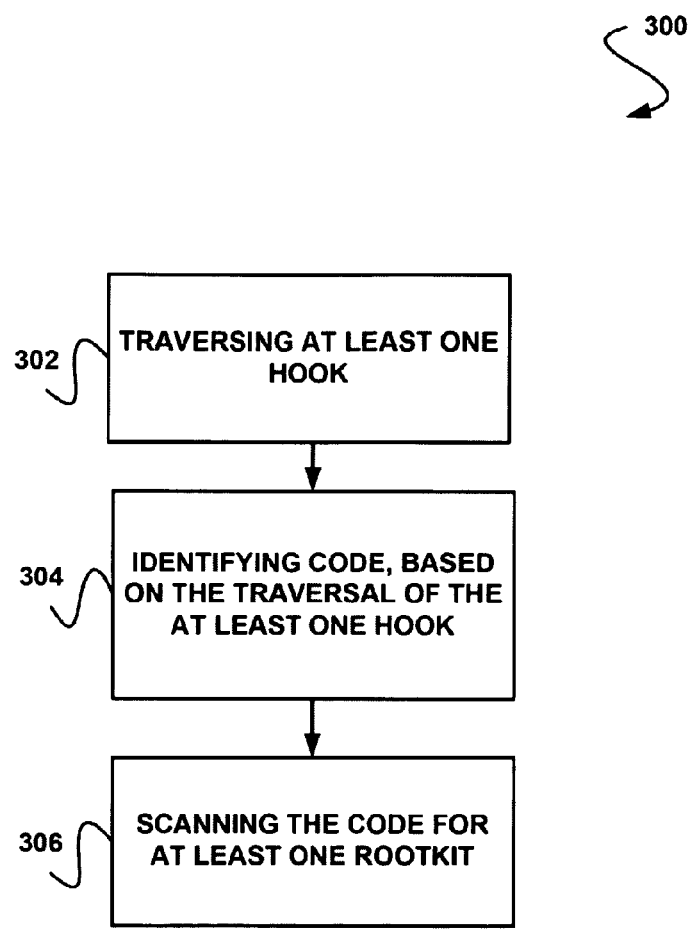
FIG. 3 illustrates a method for scanning for rootkits, in accordance with one embodiment.

FIG. 3 illustrates a method 300 for scanning for rootkits, in accordance with one embodiment. As an option, the method 300 may be carried out in the context of the architecture and environment of FIGS. 1 and/or 2. Of course, however, the method 300 may be carried out in any desired environment.

As shown in operation 302, at least one hook is traversed. In the context of the present description, the hook may include any code capable of performing a hooking operation. For example, the hook may direct a process from a first location in code (e.g. an intended destination, kernel space, etc.) to a section location in code. Thus, as an option, the hooking may include pointing to code associated with the hook.

In one embodiment, the code associated with the hook may be capable of performing a function. Optionally, the function may include any action, activity, objective, responsibility, service, work, etc. Further, as another option, the function may include pointing to another hook.

In another embodiment, the hook may be associated with a chain of hooks. For example, each hook in the chain of hooks may be called in sequence, such that an associated sequence of functions may be performed. Further, as yet another option, a first hook in the chain of hooks may be called by an operating system and/or any module related to the operating system and/or a hooked application.

Further, in yet another embodiment, the hook may be associated with (e.g. point to, be created by, etc.) memory, device drivers, a kernel, a rootkit, etc. For example, the rootkit may include malicious code for subverting a normal operation of the operating system. In still yet another embodiment, the hook may be inserted anywhere in the operating system. As an option, the hook may be inserted into the kernel of the operating system.

In still yet another embodiment, the hook may be inserted into an input/output (I/O) request packets (IRPs) dispatch table. The I/O request packets dispatch table may include kernel mode data structures. As yet another option, the kernel mode data structures may be utilized by device drivers to communicate with other device drivers. Further, as still yet another option, the kernel mode data structures may be utilized by the device drivers to communicate with the operating system.

In another embodiment, the hook may be inserted into a system service descriptor table (SSDT). As an option, the SSDT may be associated with operating system functions.

In another embodiment, the hook may be inserted into an interrupt descriptor table (IDT). Optionally, the interrupt descriptor table may be utilized to implement an interrupt vector table. As another option, the interrupt descriptor table may be utilized to determine a response to interrupts and exceptions.

Further, in one embodiment, the operating system may attempt to call an intended module to perform a function. As an option, the intended module may include an application programming interface (API), a library, a driver, a kernel, a process, an application, etc. In another embodiment, the hook may be inserted at the location of the intended module. In this way, the attempt to call the intended module may result in a call to the hook. Optionally, the hook may lead to another module to perform another function prior to the calling the intended module.

Furthermore, traversing the hook may include analyzing, examining, executing, exploring, following, investigating, probing, processing, researching, scanning, searching, etc. the hook. As an option, the hook may be identified based on the traversal of the hook. As another option, the traversing may include determining whether the hook involves at least one detour. Optionally, the detour may include a call to code associated with a hook.

In addition, in still yet another embodiment, the detour may redirect the hook from a location that was the intended destination of the hook, to another location that points to the code associated with the hook. As an option, the location that was the intended destination may include a kernel. For example, the kernel may be a central component of the operating system. Optionally, the kernel may manage the communication between hardware and software components. As yet another option, the kernel may provide for memory management, process management, device management, and/or system calls, etc.

In one embodiment, it may be determined whether the detour is destined for at least one additional detour. Thus, as an option, the detour may be destined for any number of additional detours. Optionally, the additional detour may be traversed, based on the determination. For example, if it is determined that the detour is destined for another detour, such other detour may be traversed.

Additionally, in another embodiment, the traversing may occur in kernel space. For example, the kernel space may include memory reserved for the kernel, kernel extensions, and/or device drivers. In addition, in yet another embodiment, the traversing may occur in user space. Optionally, the user space may include memory for use by applications, processes, etc. As another option, the memory may include virtual memory.

As shown in operation 304, code is identified, based on the traversal of the at least one hook. Optionally, the code may include driver code (e.g. device driver code). As an option, the code may include dynamic link library code, code in memory, a system service, a function, an application programming interface (API), a library, a process, a file on disk, a registry, etc.

Traversing the hook may identify memory of the code associated with the detour. For example, the code may be identified by following code to which the detour points. As an option, the identifying may occur in kernel space. Further, as yet another option, the identifying may occur in user space.

As shown in operation 306, the code is scanned for at least one rootkit. In one embodiment, scanning the code may include performing signature scanning on the code. For example, the code may be compared with a plurality of signatures via the scanning.

As an option, the signature scanning may include matching characteristics of the code against a list of signatures. Optionally, the signature scanning may include comparing portions of the code against the list of signatures. For example, the list of signatures may include a portion of code, memory, behavior, actions, etc. predetermined to be associated with at least one rookit. Thus, a match between the code and one of the signatures may indicate that the code includes a rootkit.

In one embodiment, the scanning may occur in user space. In another embodiment, the scanning may occur in kernel space. As another option, the scanning may be limited to code associated with the driver.

Further, in still yet another embodiment, a reaction may optionally be performed, based on the scanning. For example, the reaction may include any action taken with respect to a result of the scanning. In one embodiment, a first reaction may be performed if it is determined that the code includes a rootkit, based on the scanning.

Optionally, the first reaction may include preventing the code from further executing. As another option, the first reaction may include deleting the code. Still yet, as another option, the first reaction may include restoring the hook (e.g. from pointing to the detour to pointing to the intended destination). For example, restoring the hook may remove the code without the need for a reboot. As still yet another option, the first reaction may include flagging a file including the code for deletion. For example, the file may be flagged for deletion in response to a reboot event.

Of course, in another embodiment, a second reaction may be performed if it is determined that the code does not include a rootkit, based on the scanning. The second reaction may include allowing the code to execute, for example.

In this way, code identified based on a traversal of a hook may be scanned for detecting a rootkit. Furthermore, identifying the code via the traversal of the hook may optionally allow a particular location in memory of the code to be identified, such that a reaction may be performed with respect to the code if such code is determined to include a rootkit.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
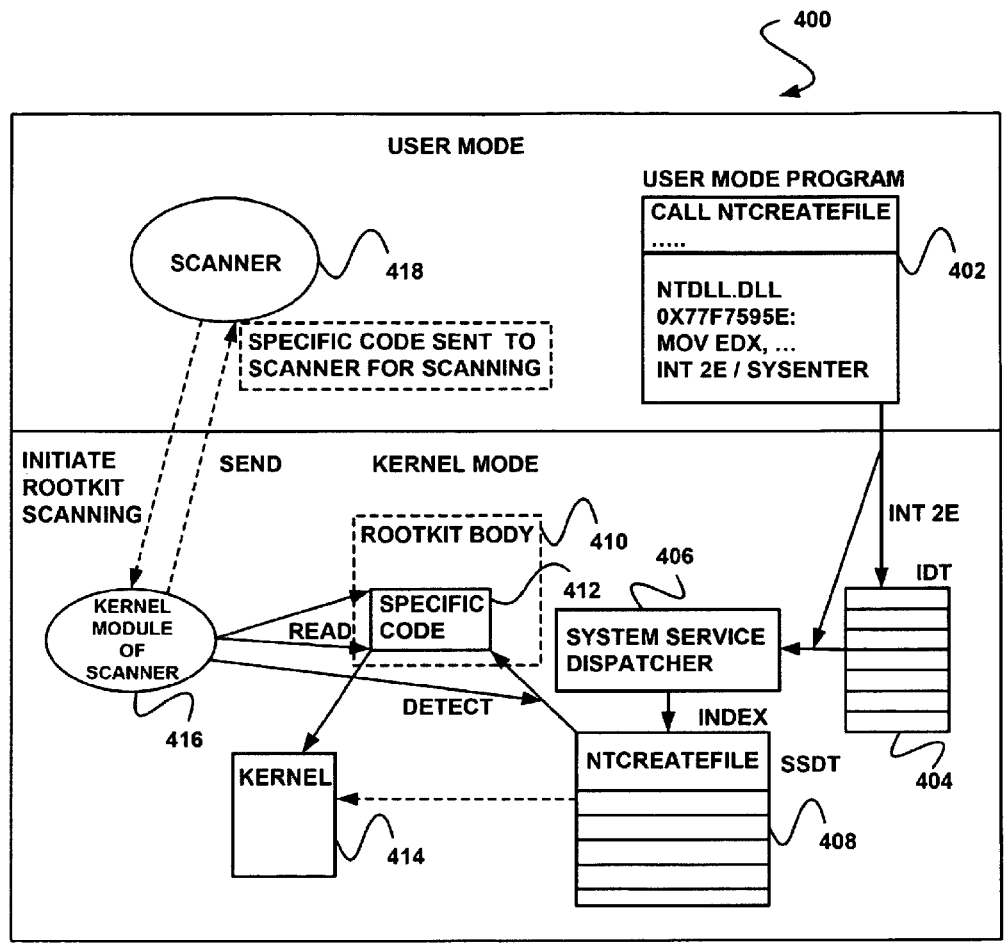
FIG. 4 illustrates a system for identifying rootkits hooked into a system service descriptor table, in accordance with another embodiment.

FIG. 4 illustrates a system 400 for identifying rootkits hooked into a system service descriptor table, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, the system 400 may include a user mode (user space) and a kernel mode (kernel space). Further, the user mode may include a user mode program 402. For example, the user mode program may include a portable executable file. In one embodiment, the user mode program 402 may make a call to a function. Optionally, the function may be handled by a library (e.g. kernel32.dll). As another option, the library may be executing in the user mode. Further, as yet another option, the library may further call an operating system function handled by the kernel mode. For example, the user mode program 402 may make a call to a function CreateFileW( ), which may in turn call an operating system function NtCreateFile( ).

Further, in another embodiment, the kernel mode of the system 400 may include an interrupt descriptor table (IDT) 404. As an option, the interrupt descriptor table (IDT) 404 may be accessed via an interrupt instruction (e.g. interrupt 2E). Further, as another option, the interrupt instruction may be initiated in response to the call to the function by the user mode program 402. Optionally, the interrupt instruction may cause a processor to execute a software interrupt in the interrupt descriptor table 404.

In yet another embodiment, the kernel mode of the system 400 may include a system service dispatcher 406. As an option, the user mode program 402 may push parameters onto a stack or pass through registers associated with the system service dispatcher 406. Further, the system service dispatcher 406 may call the operating system function at a particular index of a system service descriptor table (SSDT) 408, based on the parameters.

In yet another embodiment, the kernel mode of the system 400 may include the system service descriptor table 408. Additionally, the operating system function indexed in the system service descriptor table 408 may be hooked. For example, the system service descriptor table 408 may be hooked by a hook. Optionally, the hook may be associated with a driver, a module, a process, etc.

In still yet another embodiment, the hook may point to specific code 412. Further, as yet another option, the specific code 412 may be a part of a rootkit body 410 (e.g. rootkit driver module). Optionally, the specific code 412 may perform a malicious function. In addition, as yet another option, the specific code 412 may eventually (e.g. at some point in time) call an original handler for the operating system function. As an option, the original handler for the operating system function may include a kernel 414. For example, the kernel 414 may include any device driver, module, etc.

Furthermore, in one embodiment, a scanner 418 may initiate rootkit scanning by a kernel module 416 of the scanner 418. Optionally, the scanner 418 may execute in the user mode. As yet another option, the kernel module 416 of the scanner 418 may execute in the kernel mode.

In another embodiment, the kernel module 416 of the scanner 418 may identify hooks associated with each operating system function in the system service descriptor table 408. Additionally, the identification of the hooks may include detecting a detour associated with each hook. Optionally, the kernel module 416 of the scanner 418 may traverse each identified hook for locating the specific code 412. Further, as yet another option, once located, the kernel module 416 of the scanner 418 may read the specific code 412. This specific code 412 may include a part of code under analysis (e.g. a code which is responsible for the hook or is the target of the hook). It should be noted that this specific code 412 may be a block of code in memory which is a subpart of an entire memory (e.g. kernel memory). As another option, the specific code 412 may not necessarily lie inside the rookit body 410.

In yet another embodiment, the kernel module 416 of the scanner 418 may send the specific code 412 to the scanner 418 for scanning. As an option, the specific code 412 may be packaged by the kernel module 416 of the scanner 418 prior to sending such specific code 412 to the scanner 418. Further, in still yet another embodiment, the scanner 418 may scan the specific code 412. Optionally, the specific code 412 may be scanned utilizing signature scanning. Still yet, as another option, the scanning may identify a category of rootkits associated with the specific code 412.

Further, in one embodiment, once the category is identified, an action may be performed with respect to the specific code 412. For example, the action may include attempting to patch and/or disable the specific code 412. As another example, the action may include removing the hook pointing to the specific code 412 from the system service descriptor table 408 and restoring the original hook pointing to the kernel 414.

Figure 5:
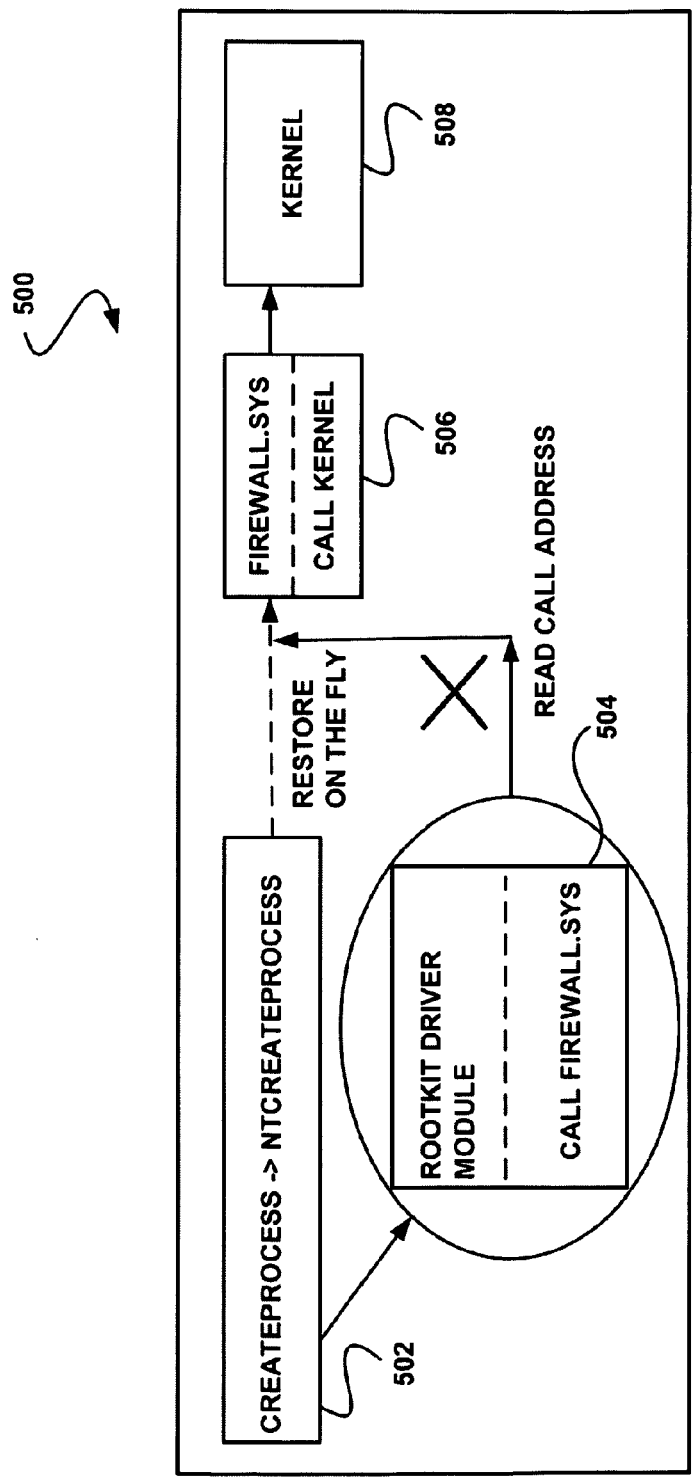
FIG. 5 illustrates a system for restoring a hook, in accordance with yet another embodiment.

FIG. 5 illustrates a system 500 for restoring a hook, in accordance with yet another embodiment. As an option, the system 500 may be implemented in the context of the architecture and environment of FIGS. 1-4. Of course, however, the system 500 may be implemented in any desired environment. It should also be noted that the aforementioned definitions may apply during the present description.

As shown, the system 500 may restore a hook. In one embodiment, the system 500 may include a calling thread or process 502. For example, the calling thread or process 502 may call a function call CreateProcess( ) which in-turn calls a kernel function NtCreateProcess( ). Further, in the context of the present example, a legitimate driver firewall.sys 506 may hook the kernel function NtCreateProcess( ), and may further call a kernel 508 to execute the kernel function NtCreateProcess( ).

Further, in another embodiment, a rootkit driver module 504 may hook the kernel function NtCreateProcess( ) prior to the legitimate driver firewall.sys 506 identifying the call to the CreateProcess( ) function. For example, by hooking the kernel function NtCreateProcess( ), the rootkit driver module 504 may create a detour to the rootkit driver module 504 in place of the legitimate driver firewall.sys 506. Additionally, as an option, after the rootkit driver module 504 has finished executing, it may call the legitimate driver firewall.sys 506.

In yet another embodiment, the legitimate driver firewall.sys 506 may perform filtering in response to the call. Further, a scanner (such as the scanner 418 of FIG. 4) may read a calling address. Optionally, the calling address may include the address that called the legitimate driver firewall.sys 506. For example, the calling address may be determined to originate from the rootkit driver module 504. As an option, the scanner may identify code associated with the calling address. Further, as yet another option, the scanner may scan the identified code. Optionally, scanning the identified code may determine if it is a known rootkit code.

If the identified code is determined to be associated with a rootkit, the scanner may restore the hook for the kernel function NtCreateProcess( ) to the legitimate driver firewall.sys

506 using the previously read calling address. Once the hook is restored, the kernel function NtCreateProcess( ) may no longer call rootkit driver module 504, and may instead call the legitimate driver firewall.sys 506. Optionally, the legitimate driver firewall.sys 506 may then call the kernel 508 to execute the kernel function NtCreateProcess( ).

To this end, a scanner may identify each hook associated with a kernel function. Optionally, the scanner may traverse each hook and may identify code associated with the hook. Further, as yet another option, if the identified code is determined to be associated with a rootkit, the scanner may attempt to restore the original hook. For example, the scanner may read an address that the rootkit utilizes to call the original hook, and may restore the hook associated with the kernel function to the original hook, thereby disabling the rootkit.

Figure 6:
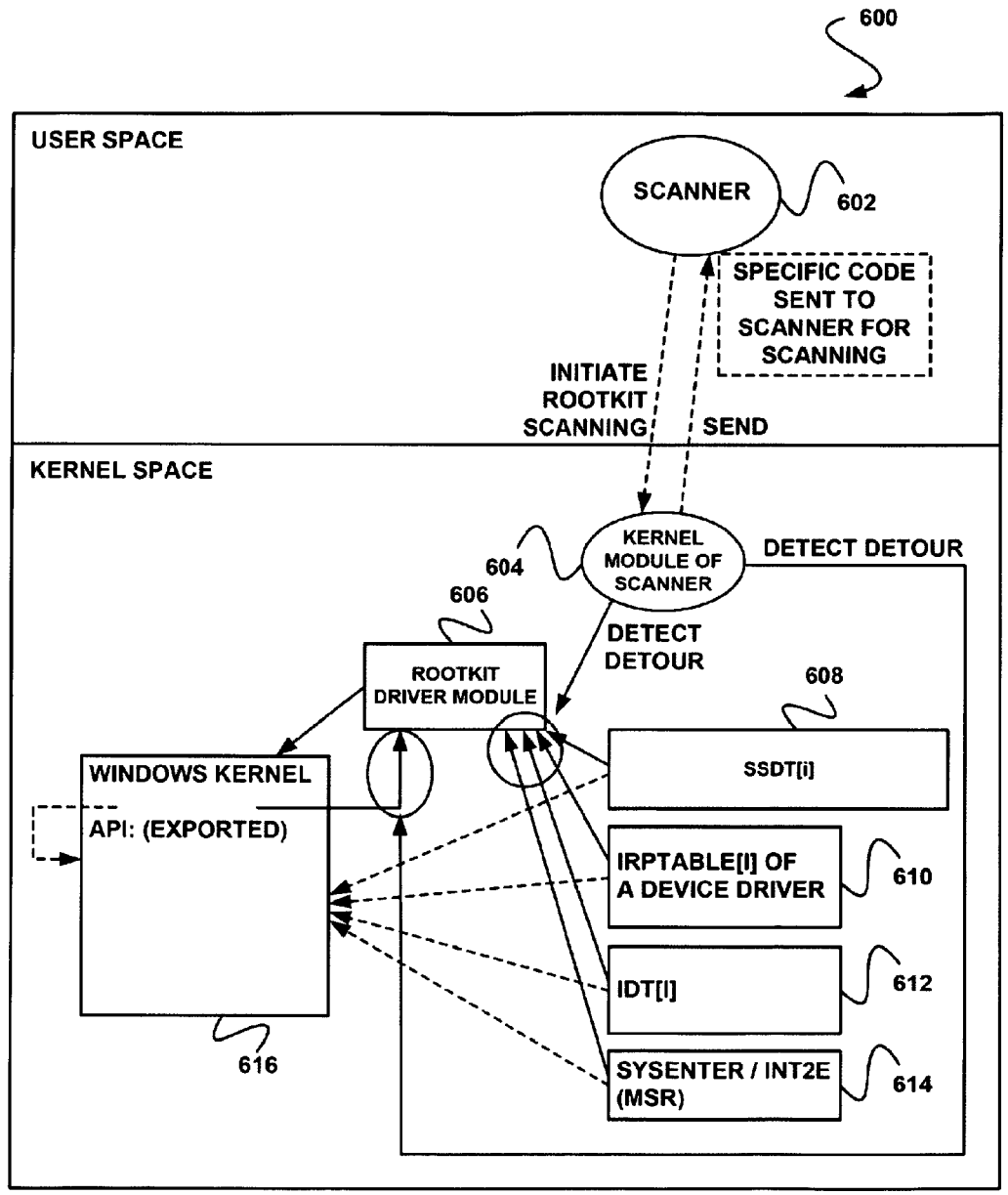
FIG. 6 illustrates a system for detecting a rootkit hook, in accordance with still yet another embodiment

FIG. 6 illustrates a system 600 for detecting a rootkit hook, in accordance with still yet another embodiment. As an option, the system 600 may be implemented in the context of the architecture and environment of FIGS. 1-5. Of course, however, the system 600 may be implemented in any desired environment. It should also be noted that the aforementioned definitions may apply during the present description.

As shown, the system 600 may include user space and kernel space. For example, the user space may include memory associated with user applications, processes, data, etc. As another example, the kernel space may include memory associated with a kernel, kernel drivers, an operating system, etc. In one embodiment, the system 600 may include a scanner 602. As an option, the scanner 602 may initiate rootkit scanning utilizing a kernel module 604 of the scanner 602. Optionally, the scanner 602 may execute in the user space. As yet another option, the kernel module 604 of the scanner 602 may execute in the kernel space.

In one embodiment, the kernel module 604 of the scanner 602 may identify a detour associated with a rootkit driver module 606. Optionally, the detour may be associated with a hook utilized by the rootkit driver module 606. Of course, as yet another option, the detour may include multiple hooks in a chain, and not simply the single hook illustrated in FIG. 6.

In another embodiment, the detour may be associated with a system service descriptor table (SSDT) 608. As an option, the KeServiceDescriptorTable 608 may include an address pointing to a system service descriptor table. For example, by hooking the SSDT 608, the rootkit driver module 606 may point an operating system function from the SSDT 608 to the rootkit driver module 606, or optionally to another system service descriptor table that may include an additional detour to the rootkit driver module 606. Optionally, the rootkit driver module 606 may detour a specific index of the KeServiceDescriptorTable 608 to the rootkit driver module 606.

In another embodiment, the detour may be associated with an I/O request packets table (IRP Table) of a device driver 610. For example, by hooking the I/O request packets table of the device driver 610, the rootkit driver module 606 may detour all calls to that device driver 610 to the rootkit driver module 606. Optionally, the rootkit driver module 606 may detour a specific index of the I/O request packets table of the device driver 610 to the rootkit driver module 606.

In yet another embodiment, the detour may be associated with an interrupt descriptor table (IDT) 612. For example, by hooking the interrupt descriptor table 612, the rootkit driver module 606 may detour all interrupts and/or exceptions from the IDT 612 to the rootkit driver module 606.

In still yet another embodiment, the detour may be associated with model specific registers (MSR) 614 utilized by a SysEnter call and/or an interrupt 2E instruction. As an option, the model specific registers 614 may describe a memory location that a processor should utilize after the SysEnter call and/or the Interrupt 2E instruction. For example, by hooking the model specific registers 614, the rootkit driver module 606 may detour each SysEnter call and/or Interrupt 2E instruction from the model specific registers 614 to the rootkit driver module 606.

In one embodiment, the detour may be associated with an application programming interface (API) exported from the windows kernel 616. For example, by hooking the API exported from the windows kernel 616, the rootkit driver module 606 may detour each function of the API 616 to the rootkit driver module 606.

Furthermore, in another embodiment, the kernel module of the scanner 604 may traverse each of the identified detours. As an option, the kernel module of the scanner 604 may locate specific code associated with a body of the rootkit driver module 606, based on the traversal. Optionally, in response to locating the specific code, the kernel module 604 of the scanner 602 may send the specific code to the scanner 602. Further, as yet another option, the scanner 602 may scan the specific code to determine if the code is associated with a rootkit.

Still yet, in another embodiment, the scanner 602 may react, based on the determination. For example, the reaction may include removing the detour to the rootkit driver module 606 by restoring original hooks, removing a file associated with the rootkit driver module 606, flagging the file associated with the rootkit driver module 606 for removal after a next reboot, updating a registry, generating an alert, etc.

Figure 7:
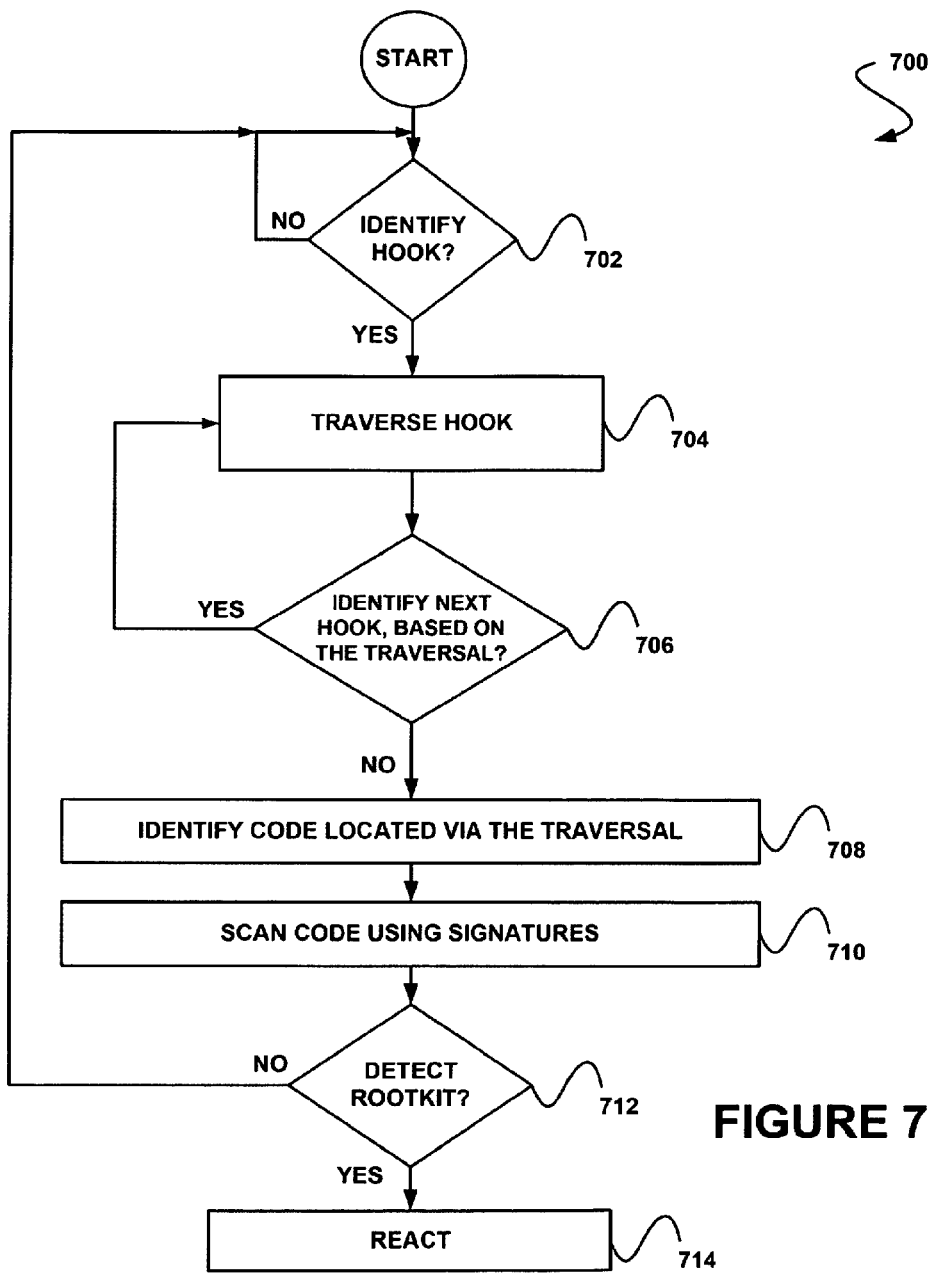
FIG. 7 illustrates a method for identifying and scanning code located via a traversal of a hook, in accordance with another embodiment.

FIG. 7 illustrates a method 700 for identifying and scanning code located via a traversal of a hook, in accordance with another embodiment. As an option, the method 700 may be carried out in the context of the architecture and environment of FIGS. 1-6. Of course, however, the method 700 may be carried out in any desired environment. It should also be noted that the aforementioned definitions may apply during the present description.

As shown in operation 702, a hook is identified. For example, an operating system function capable of being called by an application may include a hook. Further, as another example, the operating system function may include NtCreateProcess( ), NtCreateFile( ), NtOpenFile( ), NtCreateSection( ), etc.

In one embodiment, the hook may be identified by an antivirus scanner. For example, the antivirus scanner may scan memory for identifying the hook, may identify the hook in response to a call to the hook, etc. As an option, the hook may exist in kernel memory space and/or user memory space.

Further, as shown in operation 704, the hook is traversed. For example, the hook may be traversed to identify code associated with the hook. Further, in yet another embodiment, the code associated with the hook may include an additional hook.

As shown in decision 706, it is determined whether a next hook is identified, based on the traversal. For example, it may be determined whether the code identified based on the traversal of the hook is associated with an additional hook. If it is determined that the next hook is located, then the next hook is traversed, as shown in operation 704.

To this end, each hook identified during each traversal may be traversed until no additional hooks are located. As an option, the next hook may include a detour. In this way, the virus scanner may identify any number of hooks in a chain of hooks. As an option, the virus scanner may read a calling address to determine whether the hook was called by a previous hook, such that each of the hooks in the chain of hooks may be identified.

If it is determined that a next hook is not identified, based on the traversal, the code located via the traversal is identified. See operation 708. In one embodiment, the identified code may include code identified by the traversal of each hook. In another embodiment, the identified code may include code identified by the traversal of the last identified hook.

As an option, the identified code may be identified by identifying a location in memory to which the hook points. Further, as yet another option, the memory may be associated with a driver. Optionally, the identified code may include suspect portions of the driver code. For example, the identified code may be associated with a rootkit.

In one embodiment, the identified code may be sent to a virus scanner. As an option, the identified code may be packaged, for being sent to the virus scanner. Further, in various embodiments, the identified code may include information associated with the identified hooks, information associated with the identified code, the traversal order for the hooks, an identifier associated with a driver and/or memory associated with the code, etc. For example, the information associated with the hooks may include memory address information, executable code, a function hooked, a position in the chain of hooks, a hook type (e.g. Kernel, I/O request packets, system service descriptor table, interrupt descriptor table, application programming interface, model specific registers), etc.

Additionally, as shown in operation 710, the code is scanned using signatures. Optionally, each of the signatures may include any code predetermined to be associated with a rootkit. Thus, the code may be compared to the signatures, for determining whether the code includes at least one rootkit. Additionally, as yet another option, scanning only the identified code may improve scanning speeds, for example, by preventing scanning of other code not identified via the traversal. As another option, scanning the code may minimize false positives that may otherwise be associated with signature scanning of other code not identified via the traversal.

In one embodiment, the signatures may be updated in response to an availability of new signatures. As an option, a vendor of the antivirus scanner may provide the new signatures. For example, the new signatures may be pushed, pulled, downloaded, etc. to the antivirus scanner from the antivirus scanner vendor.

As shown in decision 712, it is determined if a rootkit is detected. In one embodiment, the rootkit may be detected via the scanning of the code in operation 710. For example, the scanning of the code may classify the code as a rootkit. As another example, the scanning of the code may classify the code as belonging to a particular rootkit family (e.g. a family of rootkits that share common code, etc.). To this end, by identifying the specific code (in operation 708), a rootkit family associated with the code may optionally also be identified (e.g. by detecting variants in code included in the rootkit family, etc.). Furthermore, since the identified code may be limited to only a portion of memory, a time period utilized for scanning such code may optionally be minimized (e.g. by preventing scanning of a larger portion of memory). Similarly, by identifying the specific code, false positive detections may also be minimized.

As an option, if a rootkit is not detected, another hook is identified, as shown in operation 702. Furthermore, as shown in operation 714, in response to detecting a rootkit, a reaction is performed. Optionally, the reaction may include restoring modifications resulting from the rootkit. Further, as yet another option, the reaction may include removing user mode and/or kernel mode hooks utilized by the rootkit. For example, removing the user mode and/or kernel mode hooks may allow for the removal of the rootkit without a requiring a reboot.

In one embodiment, the reaction may include repairing a registry. Optionally, repairing the registry may include deleting and/or modifying an entry of the registry associated with the rootkit. For example, removing the rootkit modifications from the registry may prevent the rootkit from executing after a reboot.

In yet another embodiment, the reaction may include deleting a file. As an option, the file may be associated with the rootkit. Thus, the file associated with the rootkit may be identified and deleted. For example, removing the file associated with the rootkit may prevent the rootkit from executing. Further, in still yet another embodiment, the file associated with the rootkit may be flagged to be deleted after a reboot. For example, after the reboot, the operating system may automatically delete the file associated with the rootkit prior to the rootkit executing after such reboot, thereby preventing the rootkit from executing.

Additionally, in still yet another embodiment, the reaction may include restoring hooks. As an option, any identified hooks may be restored to a state existing prior to an execution of the rootkit. Optionally, the address that called the hook associated with the rootkit may be modified to point to the hook to different code (e.g. a driver to which control would be returned after execution of the rootkit, etc.). For example, all of the identified hooks associated with the rootkit in both the user space and the kernel space may be restored, thereby preventing the rootkit from executing.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium for performing operations, comprising:
    traversing a chain of hooks, the chain of hooks including a plurality of hooks in which a succeeding hook is called by a previous hook in the chain, each hook having an associated calling address;
    identifying code, based on the traversal of the chain of hooks, by identifying that the calling address is associated with the code;
    determining that the chain of hooks is associated with at least one detour, which involves a redirection from an intended destination of a computer to a different location that points to the code;
    scanning the code identified by the traversing of the chain of hooks for at least one rootkit, which includes malicious code, wherein the scanning includes a comparison activity associated with a plurality of signatures associated with a plurality of rootkits;
    restoring the hook from pointing to the detour to pointing to the intended destination of the computer;
    determining whether the at least one detour is destined for at least one additional detour; and
    traversing the at least one additional detour, based on the determination.

2. The computer program product of claim 1, wherein the intended destination includes a kernel space or a user space.

3. The computer program product of claim 1, wherein the identified code is identified by following code to which the at least one detour points.

4. The computer program product of claim 1, wherein the traversing and the identifying occurs in kernel space or user space.

5. The computer program product of claim 1, wherein the scanning occurs in kernel space or user space.

6. The computer program product of claim 1, wherein the code includes one of driver code, dynamic link library code, a system service, a function, an application programming interface (API), a library, a process, a file on disk, and a registry.

7. The computer program product of claim 1, wherein the code is in memory.

8. The computer program product of claim 1, and further comprising computer code for reacting, based on the scanning.

9. The computer program product of claim 8, wherein the reacting includes preventing the code from further executing.

10. The computer program product of claim 8, wherein the reacting includes deleting the code.

11. The computer program product of claim 10, wherein a file including the code is flagged for being deleted in response to a reboot event.

12. A method, comprising:
   traversing a chain of hooks, the chain of hooks including a plurality of hooks in which a succeeding hook is called by a previous hook in the chain, each hook having an associated calling address;
   identifying code, based on the traversal of the chain of hooks, by identifying that the calling address is associated with the code;
   determining that the chain of hooks is associated with at least one detour, which involves a redirection from an intended destination of a computer to a different location that points to the code;
   scanning the code identified by the traversing of the chain of hooks for at least one rootkit, which includes malicious code, wherein the scanning includes a comparison activity associated with a plurality of signatures associated with a plurality of rootkits;
   restoring the hook from pointing to the detour to pointing to the intended destination of the computer;
   determining whether the at least one detour is destined for at least one additional detour; and
   traversing the at least one additional detour, based on the determination.

13. A system, comprising:
a first module configured for:
   traversing a chain of hooks, the chain of hooks including a plurality of hooks in which a succeeding hook is called by a previous hook in the chain, each hook having an associated calling address;
   identifying code, based on the traversal of the chain of hooks, by identifying that the calling address is associated with the code; and
   determining that the chain of hooks is associated with at least one detour, which involves a redirection from an intended destination of a computer to a different location that points to the code;
a second module in communication with the first module, the second module configured for:
   scanning the code identified by the traversing of the chain of hooks for at least one rootkit, which includes malicious code, wherein the scanning includes a comparison activity associated with a plurality of signatures associated with a plurality of rootkits;
   restoring the hook from pointing to the detour to pointing to the intended destination of the computer;
   determining whether the at least one detour is destined for at least one additional detour; and
   traversing the at least one additional detour, based on the determination;
wherein the first module and the second module are installed on a computer including a processor, and memory in communication via a bus.

* * * * *